United States Patent [19]

Dalbo et al.

[11] Patent Number: 4,483,588
[45] Date of Patent: Nov. 20, 1984

[54] MAGNIFIER WITH REFERENCE LINE

[75] Inventors: Emil J. Dalbo; Lorraine E. Dalbo, both of Atlanta, Ga.

[73] Assignee: Dal-Craft, Inc., Tucker, Ga.

[21] Appl. No.: 394,634

[22] Filed: Jul. 2, 1982

[51] Int. Cl.³ .......................... G02B 7/02; G02B 27/02
[52] U.S. Cl. ...................................... 350/247; 350/116
[58] Field of Search ................................ 350/114–116, 350/245, 247; 40/361; 33/1 K, 1 BB, 488; 434/90, 95

[56] References Cited

U.S. PATENT DOCUMENTS

| | | | |
|---|---|---|---|
| 2,057,807 | 10/1936 | Whitmore | 350/245 |
| 2,501,550 | 3/1950 | Tamagna et al. | 350/247 |
| 2,826,959 | 3/1958 | Schneider | 350/241 |
| 4,259,784 | 4/1981 | MacPherson | 350/114 |
| 4,302,192 | 11/1981 | Hamburger | 434/95 |

FOREIGN PATENT DOCUMENTS 2821002  11/1979  Fed. Rep. of Germany ...... 350/245

*Primary Examiner*—William H. Punter
*Attorney, Agent, or Firm*—James B. Middleton

[57] ABSTRACT

A magnifier for use in needlework. The magnifier has magnets at each end to allow the magnifier to stick to the usual magnet board over a graph or pattern being worked on. A reference line on the magnifier provides a convenient way to keep the place being worked on, and allows a person to see above and below the line to keep the work in context with the entire pattern.

3 Claims, 6 Drawing Figures

MAGNIFIER WITH REFERENCE LINE

FIELD OF THE INVENTION

This invention relates generally to needlework apparatus, and is more particularly concerned with a magnifying means having a reference line for use with needlework graphs.

BACKGROUND OF THE INVENTION

In several forms of needlework, the person has a pattern, or graph, that provides the necessary instructions to sew a desired design. These patterns are frequently printed in the form of a graph having around 10 or more squares to the inch. Also, the various squares of the graph are provided with symbols to indicate the particular color, stitch or the like so that it is rather easy to become confused and make an error in the needlework.

The usual apparatus to allow a person to keep up with his place on a graph is simply a straightedge that can be laid along the line being worked on. It is also common to use a straightedge in the form of a magnet, the graph being placed on a ferromagnetic board so the straightedge will remain in place.

While the prior art system functions reasonably well, it will be recognized that a person can see only the line above the straightedge, so there is never the continuity desired in planning the work. Also, since the squares in the graph may tend to be quite small, it is frequently desirable to have the squares somewhat enlarged, or magnified, to make them easier to see. This is especially important when it is remembered that each square contains a symbol to indicate the type of stitch and/or the color of yarn to be used. Magnifying glasses of numerous sorts might be utilized to magnify the graph enough to read, but such a magnifier tends to be relatively unhandy to use, and is not well adapted to be used on a graph when a person must use both hands on the needlework.

SUMMARY OF THE INVENTION

The present invention overcomes the above mentioned and other difficulties with the prior art by providing a magnifier of generally elongate configuration, the magnifier being provided with a reference line arranged to serve as a straightedge. The magnifier is also provided with magnetic means for holding the magnifier in place on a ferromagnetic board. It will therefore be understood that the present invention provides an apparatus admirably adapted for use with a graph or other instructions for needlework and the like, the device of the invention including a magnifier to extend generally across the graph to enlarge the area being worked on. One or more magnets will hold the magnifier in place, and a reference line extends generally the full length of the magnifier to allow a person to keep up with the area being worked on, and to view the work in conjunction with the surrounding area.

BRIEF DESCRIPTION OF THE DRAWINGS

These and other features and advantages of the present invention will become apparent from consideration of the following specification when taken in conjunction with the accompanying drawings in which.

DESCRIPTION OF THE EMBODIMENTS OF THE INVENTION

Figure 1:
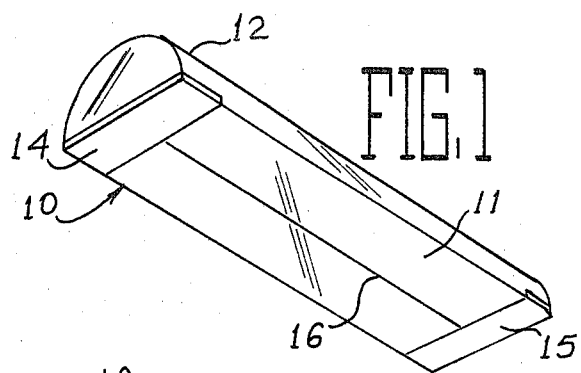
FIG. 1 is a perspective view of a magnifier made in accordance with the present invention, the magnifier being viewed from the bottom.

Referring now more particularly to the drawings and to those embodiments of the invention here presented by way of illustration, it will be seen in FIG. 1 of the drawings that the magnifier generally designated at 10 is a semi-cylindrical, transparent member as is well known in the art. It will be seen that the magnifier 10 includes a flat bottom surface 11 and an upper, cylindrical surface 12. At each end of the magnifier 10, there is a magnet such as the magnets 14 and 15. Approximately along the longitudinal center of the bottom 11, there is a visible mark 16.

Figure 2:
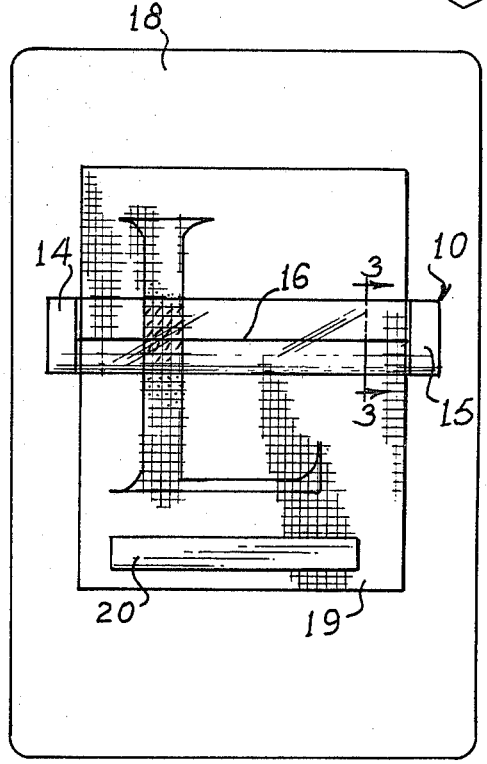
FIG. 2 is top plan view of a magnifier made in accordance with the present invention, the magnifier being shown in conjunction with a conventional board and graph.

Referring now to FIG. 2 of the drawings, there is a board 18 made of a ferromagnetic material as is conventional in the art. The graph 19 is placed against the board 18, and is usually held in place by one or more strips 20 that are magnets. The magnets 20 hold the paper graph 19 between the magnets and the ferromagnetic board 18. It should also be understood that elongate magnets such as the magnets 20 would normally be utilized to lay along one of the rows of the graph 19 to allow the person to follow a single row completely across the graph in order to achieve the desired pattern in the needlework.

As here shown, there is a magnifier 10 placed on the graph 19. Since the magnifier 10 is semi-cylindrical, it will be understood that the squares of the graph will be magnified in one direction; also, the magnifier 10 will have the greatest magnification in an area generally along the apex of the magnifier. As a result, the mark 16 will be approximately in the middle of and preferably slightly below, the space having the greatest magnification. The arrangement is such that the person will view the graph through the area of greatest magnification and the line is provided just below that area to provide a working reference.

Figure 3:
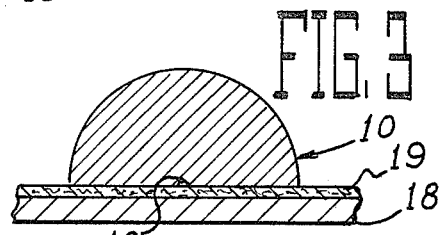
FIG. 3 is an enlarged cross-sectional view taken substantially along the line 3—3 in FIG. 2; and, FIGS. 4, 5 and 6 are partial perspective views showing one end of a magnifier made in accordance with the present invention, and showing three different arrangements for attaching a magnet to an end of the magnifier.

Looking now at FIG. 3 of the drawings, it will be seen that the mark 16 may be physically cut into the body of the magnifier 10; or, if the magnifier 10 is made of styrene or other thermoplastic material, the mark 16 can be provided by urging a heated blade or the like into the bottom surface 11 to provide the desired indentation. Preferably, the indentation would then have a paint or ink placed therein to render the indentation more easily visible. The magnifier 10 will be slid back and forth across the graph 19 so that simple painting or printing of the reference line may not be quite as durable. As a result, the arrangement here shown would be desirable though the printing or painting may be satisfactory.

In needlework utilizing instructions or graphs such as the graph 19 shown in FIG. 2 of the drawings, the most commonly used graphs are printed in black ink on white paper, though there is some variation both in the color used in a one color printing, and in using two or more colors for the graphs. As a result, the mark 16 can be provided in a color that gives the best contrast with the graph. A bright color, such as red or the like, may provide easy visibility on graphs printed in dark blue or black, but a black line may be more desirable when using multi-colored graphs or the like.

Figure 4:
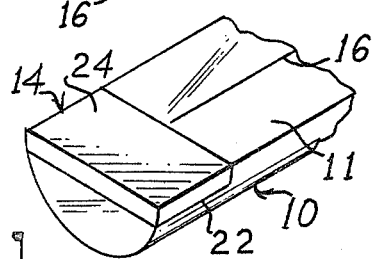

FIG. 4 of the drawings shows an enlarged, inverted, version of the same magnifier 10 shown in FIG. 1 of the drawings. In FIG. 4 it will be seen that the magnet 14 is provided by having an indentation 22 in the end portion of the magnifier 10. The magnet 14 is then a generally rectangular member that fits precisely within the notch 22. It will be observed that the bottom surface 24 of the magnet 14 is substantially coplanar with the bottom surface 11 of the magnifier 10; and further, the mark 16 is substantially at the bottom surface 11. This arrangement is important in order to place the mark 16 as close as possible to the surface of the graph 19. If the mark 16 is held above the graph 19, there will be parallax error in using the magnifier 10.

Figure 5:
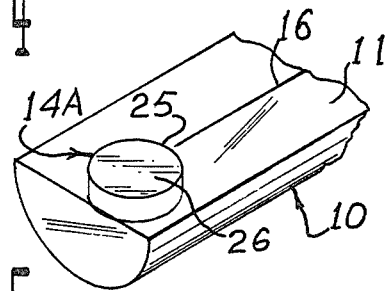

The magnifier shown in FIG. 5 of the drawings is the same as that shown in FIG. 4, but showing a different means for mounting the magnet. Thus, the magnifier is designated at 10 and other portions of the magnifier are also designated by the same numerals previously used herein. The only difference is the magnet, and the magnet in FIG. 5 is designated at 14A. The magnet 14A is shown as a disk which is received within a circular notch 25 in the magnifier 10. The notch 25 could be molded in the magnifier 10, and the magnet 14A could easily be inserted, either with glue to hold the magnet 14A in place, or simply heat-sealed or the like. The operation of the magnet shown in FIG. 5 is the same as previously discussed, the lowermost surface 26 of the magnet 14A being substantially coplanar with the lower surface 11 of the magnifier 10.

Figure 6:
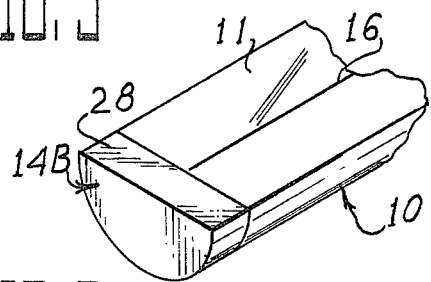

Another form of magnet is shown in FIG. 6 of the drawings, the magnet 14B being attached to the end of the magnifier 10. In this embodiment, it will be seen that the mark 16 extends completely to the end of the magnifier 10, and the magnet 14B is simply attached to the very end of the magnifier 10. The magnet 14B is shown as having the same configuration as the magnifier 10, though it will be understood that other shapes could be used as long as the bottom surface 28 is substantially coplanar with the bottom surface 11 of the magnifier 10. Again, the magnet 14B can be attached by gluing or the like.

In view of the foregoing discussion, it will be seen that the present invention provides a very convenient magnifier for use with needlework graphs and the like, the device including one or more magnets to hold the magnifier in place, and a reference line, or mark 16, located susbstantially in the plane of the thing to be magnified to prevent parallax error. The reference line is generally along the centerline of the cylindrical magnifier, or preferably somewhat below the center so that a person using the magnifier will be working primarily in the area of maximum magnification.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention, as defined in the appended claims.

We claim:

1. A magnifier, for use in needlework wherein instructions are mounted on a ferromagnetic board, said magnifier including a magnifying lens disposable across said instructions, magnet means carried by said magnifying lens for holding said magnifier to said ferromagnetic board, said magnifying lens having a flat bottom surface that engages said instructions, said magnifier including a reference line defined substantially at said bottom surface, said magnifying lens being semicylindrical in shape, said reference line being located slightly off center of said flat bottom surface for providing a work reference when viewing said instructions through the apex of said semicylindrical shape.

2. A magnifier as claimed in claim 1, said magnet means comprising a first permanent magnet fixed to one end of said magnifying lens, and a second permanent magnet fixed to the opposite end of said magnifying lens, both said first permanent magnet and said second permanent magnet having bottom surfaces coplanar with said flat bottom surface of said magnifying lens.

3. A magnifier as claimed in claim 2, said reference line comprising a linear indentation in said bottom surface of said magnifying lens, said reference line extending from said first magnet to said second magnet.

* * * * *